(12) United States Patent
Inaki

(10) Patent No.: US 6,458,445 B1
(45) Date of Patent: Oct. 1, 2002

(54) QUARTZ GLASS JIG HAVING LARGE IRREGULARITIES ON THE SURFACE AND METHOD FOR PRODUCING THE SAME

(75) Inventor: Kyoichi Inaki, Tokorozawa (JP)

(73) Assignees: Heraeus Quarzglas GmbH & Co. KG (DE); Shin-Etsu Quartz Products Co., Ltd. (JP)

( * ) Notice: Subject to any disclaimer, the term of this patent is extended or adjusted under 35 U.S.C. 154(b) by 0 days.

(21) Appl. No.: 09/601,155

(22) PCT Filed: Nov. 29, 1999

(86) PCT No.: PCT/EP99/09261
§ 371 (c)(1),
(2), (4) Date: Aug. 11, 2000

(87) PCT Pub. No.: WO00/32529
PCT Pub. Date: Jun. 8, 2000

(30) Foreign Application Priority Data

Dec. 1, 1998 (JP) .............................. 10-342157

(51) Int. Cl.[7] ................................. D06N 7/04
(52) U.S. Cl. ............ 428/141; 428/141; 428/142; 428/410; 428/428; 428/427; 428/9; 428/249.15; 428/337; 428/341; 428/344
(58) Field of Search ............... 428/141, 142, 428/428, 410; 427/249.15, 9, 337, 341, 344; 216/97, 98, 99; 438/905

(56) References Cited

U.S. PATENT DOCUMENTS

| | | | | |
|---|---|---|---|---|
| 3,882,901 A | * | 5/1975 | Seiler et al. ................. | 138/141 |
| 5,562,774 A | * | 10/1996 | Breidenbach et al. ....... | 118/715 |
| 5,618,448 A | * | 4/1997 | Kuroe et al. .................. | 216/97 |
| 6,150,006 A | * | 11/2000 | Hellmann et al. .......... | 428/141 |

FOREIGN PATENT DOCUMENTS

| | | |
|---|---|---|
| DE | 19713014 A1 | 3/1997 |
| EP | 0704891 A1 | 4/1996 |
| JP | 03187954 | 8/1991 |
| JP | 08104541 | 4/1996 |
| JP | 10-081029 | 10/1998 |
| JP | 9-282757 | 4/1999 |

* cited by examiner

*Primary Examiner*—Harold Pyon
*Assistant Examiner*—Patricia L. Nordmeyer
(74) *Attorney, Agent, or Firm*—Milde & Hoffberg LLP

(57) ABSTRACT

A quartz glass jig having large irregularities on the surface thereof, wherein said irregularities have a center line roughness Ra in the range of from 2 to 30 μm, a maximum height Rmax in the range of from 10 to 150 μm, and a width in the range of from 10 to 500 μm, and by a method which comprises forming an inorganic thin film on the surface of a quartz glass jig free from microcracks and having fine irregularities on the surface thereof and thereafter rinsing it a plurality of times.

11 Claims, 2 Drawing Sheets

QUARTZ GLASS JIG HAVING LARGE IRREGULARITIES ON THE SURFACE AND METHOD FOR PRODUCING THE SAME

INDUSTRIAL FIELD OF APPLICATION

The present invention relates to a quartz glass jig and a method for producing the same; in further detail, it relates to a quartz glass jig free from microcracks and having large irregularities on the surface thereof, and to a method for producing the same.

Prior Art

Conventionally, high purity quartz glass jigs having a relatively high thermal resistance and high chemical resistance are widely used for the production of semiconductor devices. Furthermore, it is often the case that irregularities are intentionally provided on the surface of the jigs, and these irregularities are generally formed by frost treatment. However, a conventional frost treatment comprises shaving off the surface of the quartz glass jigs by spraying a powder of crystalline silicon dioxide. Thus, microcracks generate at the same time irregularities are formed, and this caused selective etching of the microcracks during the subsequent rinsing treatment using an aqueous solution of hydrogen fluoride. This led to problems such as the adhesion of etching solution or to the generation of particles which contaminate the semiconductor products.

As a means to solve the problems above, in JP-A-Hei10-273339 (the term, "JP-A" as referred herein signifies "an unexamined published Japanese patent application") is proposed a quartz glass jig having a rough surface formed by a structure comprising irregular elevations extended between the first upper level and the second lower level, the surface of which having an average height in the range of from 0.1 to 10 $\mu$m and protruded portions having an average width in the range of from 30 to 180 $\mu$m. In Japanese patent application JP-Hei-9-282757 is proposed a quartz glass jig having spherical or ellipsoidal irregularities on the surface thereof.

When CVD process is carried out by using the former type of quartz glass jig above, however, although thin films free from the generation microcracks and in which the generation of particles is suppressed are obtained in the initial stage, the irregularities on the surface of the jig are lost with repeated rinsing. This was found to cause a problem of forming microcracks on the thus vapor deposited thin film, which led to the generation of particles that contaminate the semiconductor products. Thus quartz glass jigs should be obtained capable of realizing thin films deposited by CVD process free from the formation of microcracks even after repeated rinsing and free from the generation of microcracks, thereby capable of obtaining semiconductor products free from contamination. The present invention has been accomplished based on these findings.

SUMMARY OF THE INVENTION

Thus, an object of the present invention is to provide a quartz glass jig having large irregularities on the surface thereof.

Furthermore, another object of the present invention is to provide a quartz glass jig which realizes an oxidation film formed by CVD process and the like free from the formation of microcracks even after repeated rinsing, and which is also free from causing contamination of semiconductor products attributed to the generation of particles.

Yet further object of the present invention is to provide a simple method for producing the quartz glass jig above.

Accordingly, the present inventors have intensively conducted studies to solve the problems above. The present invention which accomplishes the objects above provides a quartz glass jig having large irregularities on the surface thereof, characterized in that said irregularities have a center line roughness Ra in the range of from 2 to 30 $\mu$m, a maximum height Rmax in the range of from 10 to 150 $\mu$m, and a width in the range of from 10 to 500 $\mu$m on the surface of the quartz glass jig, and a method for producing the same, which comprises repeating several times a process of forming an inorganic thin film on the surface of a quartz glass jig free from microcracks and having fine irregularities on the surface thereof, and thereafter rinsing it.

The quartz glass jig according to the present invention is useful as a jig for use in the semiconductor industry, for example, a furnace core tube, a boat for mounting wafers thereon, etc. The quartz glass jig is free from microcracks, and which comprises a surface on which irregularities are partly or entirely formed with a center line roughness Ra in the range of from 2 to 30 $\mu$w, preferably, from 10 to 30 $\mu$m, a maximum height Rmax in the range of from 10 to 150 $\mu$m, preferably, from 50 to 150 $\mu$m, and a width in the range of from 10 to 500 $\mu$m. Because the quartz glass jig comprises such large irregularities and is free from microcracks, there is no change in surface roughness even after an etching treatment using a 5% hydrofluoric acid, and it maintains the irregularities without change in center line roughness and in the maximum height. Accordingly, even if these quartz glass jigs are used in CVD processes and are subjected to repeated rinsing, the oxide films formed thereon remain free from microcracks and do not contaminate semiconductor products attributed to the generation of particles. Particularly preferred is, as shown in FIG. 1, that the irregularities are formed from a plurality of slopes, and the apex at which the slopes cross with each other forms an edge line, for example, the irregularities are formed in a shape similar to the roofs such as a gable roof or a hip roof. The slopes above may be planar or curved planes. The term "rinsing" as referred herein signifies rinsing using an aqueous hydrofluoric add solution, or a mixed solution of hydrofluoric acid with an inorganic acid such as nitric acid or sulfuric acid. If the irregularities have a center line roughness Ra of lower than 2 $\mu$m, the thin film is subject to the generation of microcracks, and if the irregularities yield a center line roughness Ra exceeding 30 $\mu$m, it becomes difficult to form large irregularities. Similar to the case of center line roughness Ra, irregularities having a maximum Rmax or a width falling out of the aforementioned ranges cannot form a favorable quartz glass jig.

Futhermore, it has been found that the quartz glass jig having large irregularities on the surface thereof can easisy be produced by repeating the steps of forming an inorganic thin film on the surface of a quartz glass jig free from microcracks but having fine irregularities, followed by rinsing.

The quart glass jig having large irregularities on the surface thereof can be produced by first forming a thin film of silicone and the like in accordance with, for instance, the description given in the specification of Japanese patent application JP-Hei-9-282757, and then subjecting the resulting product to an etching treatment using an aqueous solution of hydrofluoric acid, or by immersing the quartz glass jig into a solution consisting of a mixture of hydrofluoric acid, ammonium fluoride, and acetic acid in accordance with the frost treatment as described in JP-A-Hei10-273339, thereby forming fine irregularities free from microcracks on the surface by using the precipitates of ammonium silicofluoride, and then repeating at least twice a step of coating the surface of the jig with an inorganic thin film followed by rinsing until there is formed irregularities having a center line roughness Ra in a range of 2 to 30 μm, preferably, in a range of 10 to 30 μm, a maximum height Rmax in a range of 10 to 150 μm, preferably, in a range of 50 to 150 μm, and a width in a range of 10 to 500 μm. Unlike the case of a conventional sandblasting method, in which microcracks are generated and in which aqueous hydrofluoric acid intrudes into the microcracks to form acute front ends due to the release thereof into oval shapes, the above method of forming irregularities comprising coating an inorganic thin film and rinsing, the apices of the irregularities are formed in the shape of smooth slopes. As the inorganic thin films above, there can be mentioned thin films of at least one type of material selected from silicon compounds, silicon nitride compounds, silicon oxide compounds, and silica glasses. The reason why large irregularities are formed by thus rinsing after forming an inorganic thin film on the surface of a quartz glass having fine irregularities and free from microcracks is that, presumably, visually non-discernible fine microcracks are formed at the time the thin film is formed on the indented portions of the fine irregularities, and the rinsing solution intrudes along the fine microcracks as to selectively etch and enlarge the irregularities, The inorganic thin film is preferably formed in a range of from 0.1 to 100 μm. If the thin film is formed at a thickness less than 0.1 μm, there is no increase in roughness nor formation of large irregularities on rinsing. If the thin film is formed at a thickness exceeding 100 μm, visually observable linear microcracks form, and these microcracks reach to the quartz glass jig and develop in such a manner to surround the quartz glass jig. Thus, it is not preferred because quartz glass tends to fall off.

BRIEF DESCRIPTION OF THE DRAWINGS

FIG. 1 is a secondary electron image photograph of the surface of a quartz glass jig according to the present invention observed under a scanning electron microscope at a magnification of 50 times.

FIG. 2 is a secondary electron image photograph of the surface of a quartz glass jig having formed thereon a poly-Si film and rinsed four times, observed under a scanning electron microscope at a magnification of 50 times.

FIG. 3 is a profile obtained by measuring the surface of a quartz glass jig according to the present invention using a surface roughness meter.

FIG. 4 is a profile obtained by using a surface roughness meter on the surface of a quartz glass jig having formed thereon a poly-Si film and rinsed four times.

BRIEF DESCRIPTION OF THE PREFERRED EMBODIMENTS

An embodiment of the invention is described below by way of examples and drawings, but it should be understood that the present invention is not limited thereto.

EXAMPLE 1

Figure 1:
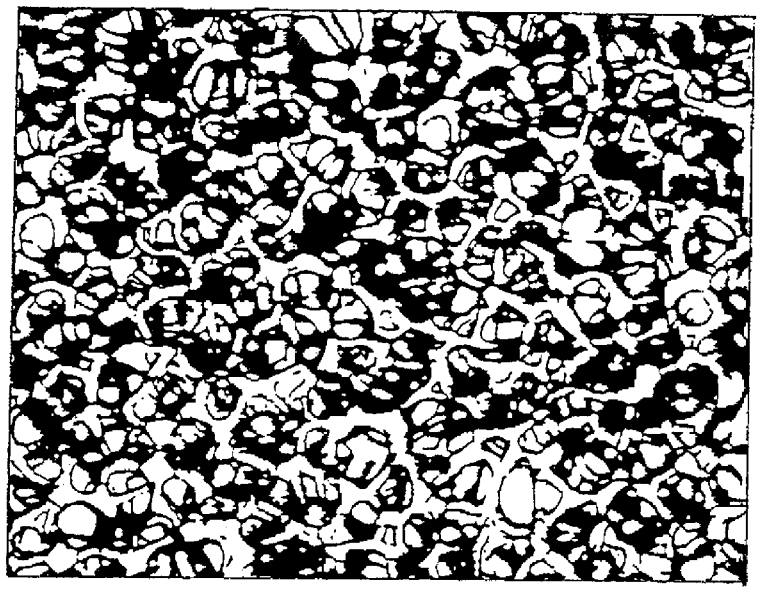
FIG. 1.
Figure 3:
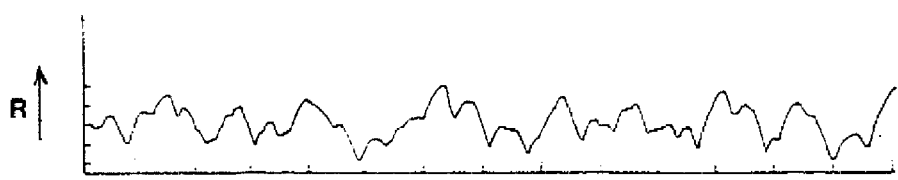
FIG. 3.

A quartz glass tube was immersed into a solution obtained by mixing about 24% by weight of an aqueous 50% hydrofluoric acid solution, about 17% by weight of ammonium fluoride, about 35% by weight of an aqueous 100% acetic acid solution, and about 24% by weight of water, to thereby obtain fine crystals of ammonium silicon fluoride as precipitates. The quartz glass tube thus obtained yielded a center line roughness Ra of 0.5 μm, a maximum height of the irregularities Rmax of 2 μm, but no microcracks were observed visually. A poly Si film was vapor deposited on the surface of the thus obtained quartz glass tube at a thickness of 10 μm, and the rinsing process using a mixed solution of hydrofluoric acid and nitric acid was repeated four times. Referring to FIG. 1, on the surface of the resulting quartz glass tube were formed irregularities consisting of a plurality of slopes, and an edge line was formed at the apex at which the slopes cross each other. FIG. 1 above is a secondary electron image obtained by scanning electron microscope at a magnification of 50 times. The surface of the quartz glass jig thus obtained was measured using a surface roughness meter (Model Surfcom 300B, manufactured by Tokyo Seimitsu Co., Ltd.), and the results are shown in FIG. 3, in which the longitudinal direction (x-axis) is magnified by 500 times, and the horizontal direction (y-axis) is magnified by 300 times, the latter characterizing the roughness R. Referring to FIG. 3, the surface of the quartz glass jig yields a center line roughness Ra of 13 μm, a maximum height of the irregularities Rmax of 80 μm, and an average width of the irregularities of 100 μm. The thus obtained quartz glass tube was used in a CVD process for silicon wafers, and no generation of particles was found even after rinsing for four times.

Comparative Example 1

A quartz glass tube was immersed into a solution obtained by mixing about 24% by weight of an aqueous 50% hydrofluoric acid solution, about 17% by weight of ammonium fluoride, about 35% by weight of an aqueous 100% acetic acid solution, and about 24% by weight of water, to thereby obtain fine crystals of ammonium silicon fluoride as precipitates. The quartz glass tube thus obtained yielded a center line roughness Ra of 0.5 μm, a maximum height of the irregularities Rmax of 2 μm. The resulting quartz glass tube was directly used in a CVD process for silicon wafers, but particles were generated after rinsing for four times, and it was confirmed that contamination occurred on the silicon wafer.

Comparative Example 2

Figure 2:
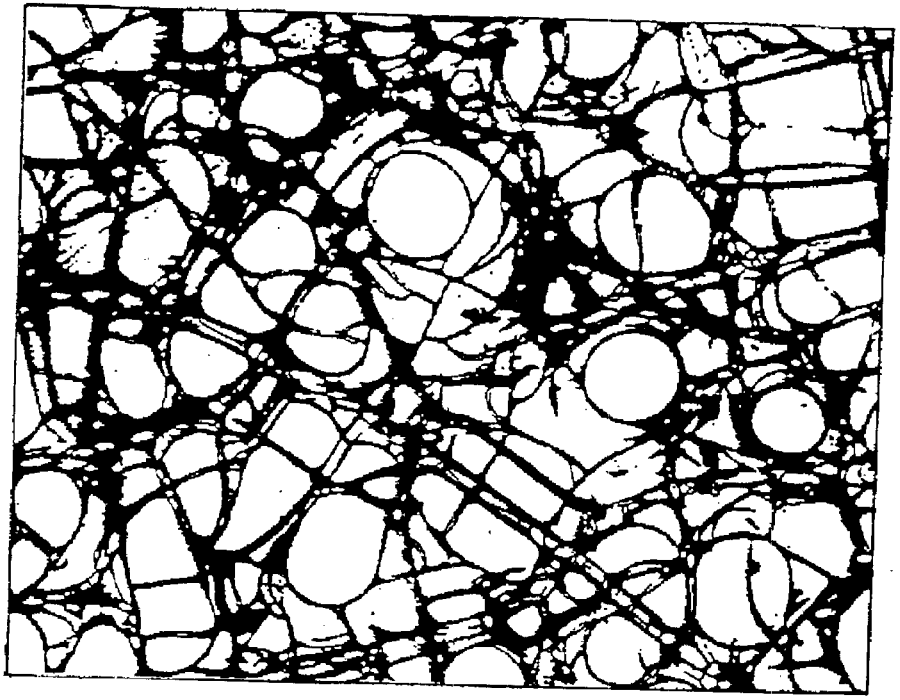
FIG. 2.
Figure 4:
FIG. 4.

A poly Si film was vapor deposited on the surface of a transparent quartz glass tube at a thickness of 10 μm, and the resulting product was subjected to four times of rinsing using a mixed solution of hydrofluoric acid and nitric acid. As shown in FIG. 2, numerous linear microcracks on the glass were found to be generated on the surface of the quartz glass tube obtained. FIG. 2 is a secondary electron micrograph obtained by a scanning electron microscope operated at a magnification of 50 times. Furthermore, the surface of the resulting quartz glass tube was measured using a surface roughness meter in a manner similar to that described in Example 1, and a graph enlarged by 500 times in the vertical direction and by 300 times in the horizontal direction is shown in FIG. 4. Referring to FIG. 4, the center line roughness Ra was 6 μm, and the maximum height of the irregularities Rmax was 40 μm. The quartz glass tube thus obtained was used in a CVD process for silicon wafers, but the test was interrupted due to the generation of abnormal particles.

The quartz glass jig according to the present invention has large irregularities on the surface thereof and yet is free from microcracks. When the quartz glass jig is used in the CVD processes for producing semiconductor products, it can be reused in CVD processes even after it is rinsed for a plurality of times without forming any microcracks and the like on oxide films, and without contaminating the semiconductor products attributed to the formation of particles. Fine irregularities free microcracks can be formed on the surface of the quartz glass of the quartz glass jigs, and it can be easily produced by repeating, for a plurality of times, the process of forming a coating of an inorganic thin film on the surface thereof and rinsing it thereafter. Thus, the present invention is of high value in the industry.

What is claimed is:

1. A quartz glass jig having large irregularities on the surface thereof, and being free from visually discernible microcracks, wherein said irregularities have a center line roughness Ra in the range of from 2 to 30 $\mu$m, a maximum height Rmax in the range of from 10 to 150 $\mu$m, and a width in the range of from 10 to 500 $\mu$m.

2. A quartz glass jig as claimed in claim 1, wherein said irregularities have a center line roughness Ra in the range of from 10 to 30 $\mu$m, a maximum height Rmax in the range of from 50 to 150 $\mu$m, and a width in the range of from 10 to 500 $\mu$m.

3. A quartz glass jig as claimed in claim 1, wherein said irregularities are formed from a plurality of slopes, and the apex at which the slopes cross with each other forms an edge line.

4. A quartz glass jig as claimed in claim 2, wherein said irregularities are formed from a plurality of slopes, and the apex at which the slopes cross with each other forms an edge line.

5. A quartz glass jig as claimed in claim 1, wherein the quartz glass jig having large irregularities on the surface thereof is a jig for use under an atmosphere for forming a thin film by reacting gaseous starting materials.

6. A quartz glass jig as claimed in claim 2, wherein the quartz glass jig having large irregularities on the surface thereof is a jig for use under an atmosphere for forming a thin film by reacting gaseous starting materials.

7. A quartz glass jig as claimed in claim 3 wherein the quartz glass jig having large irregularities on the surface thereof is a jig for use under an atmosphere for forming a thin film by reacting gaseous starting materials.

8. A method for producing a quartz glass jig having large irregularities on the surface thereof, which comprises repeating several times a process of forming an inorganic thin film on the surface of a quartz glass jig free from microcracks and having fine irregularities on the surface thereof, and thereafter rinsing with a liquid etchant, to produce said quartz jig having large irregularities; wherein said irregularities have a center line roughness Ra in the range of from 2 to 30 $\mu$m, a maximum height Rmax in the range of from 10 to 150 $\mu$m, and a width in the range of from 10 to 500 $\mu$m.

9. A method for producing a quartz glass jig having large irregularities on the surface thereof as claimed in claim 8 wherein the inorganic thin film is formed from at least one type selected from the group consisting of a silicon compound, a silicon nitride compound, a silicon oxide compound, and a silica based glass.

10. A method for producing a quartz glass jig having large irregularities on the surface thereof as claimed in claim 8, wherein the thickness of the thin film is in the range of from 0.1 to 100 $\mu$m.

11. A method for producing a quartz glass jig having large irregularities on the surface thereof as claimed in claim 9, wherein the thickness of the thin film is in the range of from 0.1 to 100 $\mu$m.

* * * * *